United States Patent
Tung et al.

(10) Patent No.: US 8,657,499 B2
(45) Date of Patent: Feb. 25, 2014

(54) HEAVY LOAD BEARING

(75) Inventors: Chao-Nien Tung, Hsinchu (TW);
Han-Ching Liu, Hsinchu (TW);
Lung-Wei Huang, Hsinchu (TW)

(73) Assignee: Newcera Technology Co., Ltd., Bandar Seri Begawan (BN)

( * ) Notice: Subject to any disclaimer, the term of this patent is extended or adjusted under 35 U.S.C. 154(b) by 0 days.

(21) Appl. No.: 13/252,765

(22) Filed: Oct. 4, 2011

(65) Prior Publication Data

US 2012/0087609 A1    Apr. 12, 2012

(30) Foreign Application Priority Data

Oct. 5, 2010  (TW) ................................ 99133917 A

(51) Int. Cl.
*F16C 17/00*    (2006.01)
*F16C 33/10*    (2006.01)
*F16C 37/00*    (2006.01)

(52) U.S. Cl.
USPC ............ 384/289; 384/129; 384/313; 384/322

(58) Field of Classification Search
USPC ............ 310/90; 384/241, 276, 279, 286–291, 384/307, 311, 313–316, 322, 385, 386, 392, 384/397, 400, 129
See application file for complete search history.

(56) References Cited

U.S. PATENT DOCUMENTS

| | | | | |
|---|---|---|---|---|
| 314,731 A * | 3/1885 | Siebert | ........................... | 384/385 |
| 701,292 A * | 6/1902 | Canda | ........................... | 295/17 |
| 706,906 A * | 8/1902 | Davis, Jr. | ........................ | 384/289 |
| 783,870 A * | 2/1905 | Knapp | ........................... | 384/286 |
| 1,489,466 A * | 4/1924 | Stern et al. | ...................... | 277/516 |
| 1,927,534 A * | 9/1933 | Wooler | ........................... | 384/474 |
| 3,503,660 A * | 3/1970 | Mori | ............................. | 384/400 |
| 3,917,362 A | 11/1975 | Stedman | | |
| 5,145,266 A * | 9/1992 | Saneshige et al. | ............. | 384/322 |
| 6,547,439 B2 * | 4/2003 | Chen | ............................. | 384/114 |
| 6,699,020 B1 * | 3/2004 | Lin | ................................ | 417/354 |
| 6,746,155 B2 * | 6/2004 | Chen | ............................. | 384/279 |
| 2002/0146183 A1 * | 10/2002 | Chen | ............................. | 384/397 |
| 2006/0171618 A1 | 8/2006 | Shih | | |

FOREIGN PATENT DOCUMENTS

GB       1389857 (A)       4/1975

* cited by examiner

*Primary Examiner* — Alan B Waits
(74) *Attorney, Agent, or Firm* — Muncy, Geissler, Olds & Lowe, P.C.

(57) ABSTRACT

A heavy load bearing includes a casing and assembly having at least two units and an axial hole run-through by a shaft. Each unit has a mounting portion on the circumferential outer surface, two connection portions at two ends, an axle hole, and at least one groove indented axially from the connection portion and formed between an outer wall near the mounting portion and an inner wall near the axle hole. At least one set of multiple notches is formed annularly on a free end of the inner wall and communicating with the groove and axle hole. The casing has an axial cavity to hold the assembly. Two abutting units are coupled to form at least one storage chamber to store lubricating media. The notches of the two abutting units form at least one set of multiple fine flow passages communicating with the axial hole and storage chamber.

16 Claims, 15 Drawing Sheets

HEAVY LOAD BEARING

TECHNICAL FIELD

The present disclosure relates to a heavy load bearing, and particularly to a heavy load bearing that includes at least two units each having at least one groove coupled together to form at least one storage chamber to store lubricating media, and generate continuous multi-channel dynamic pressure to support rotation of a shaft and recycle the lubricating media.

DESCRIPTION OF RELATED ART

Conventional bearing usually is hard to long-term operation under a variety of severe operating conditions, such as abnormal high and low temperatures, heavy loading, high spinning speeds and strong vibration. After a short period of shaft spinning lubricating media could be gradually exhausted. As a result of deteriorating tribology interface between axial hole and periphery of the spinning shaft, the shaft could be directly contacted with the axial hole to induce high frequency knocks and impacts, resulting in excessive abrasion and heat generation. So that abnormal signs such as electric current increase, noise generation, shaft scraping, enlarging of axial hole could take place and accelerate damage of the bearing. These are the urgent problems of the conventional bearing yet to be overcome.

US2006/01716181A1 proposes a self-lubrication bearing with a hollow assembly coupled on a shaft. The assembly has T-shaped two-stepped cylindrical struts coupled together through a smaller end to form an indented circumference, and a hollow barrel casing coupled on the assembly to form a storage chamber between them to store lubricating oil. A gap is formed on the connection surface of the storage chamber to allow the lubricating oil to seep and flow into the axial hole. However, lubricants of a higher viscosity cannot be used on the aforesaid bearing.

GB1389857A discloses another type of self-lubrication bearing with a hollow cylindrical barrel made from plastics by injection to couple on a shaft. The plastic unit has a plurality of protrusive fin-shaped circular rings formed radially and spaced from each other axially, and a hollow barrel casing to couple on the circumference of the plastic unit so that adjacent circular rings form a plurality of annular storage chambers to store lubricating media. The lubricating media seep and flow into the axial hole through a plurality of apertures formed in the storage chambers. But for the bearing made with a stronger structure through metal or ceramic material, other types of fabrication process have to be adopted. The structure is more complex, and the possibility of mass production is lower.

U.S. Pat. No. 3,917,362A discloses a self-lubrication bearing formed by coupling a hollow assembly on a shaft. The assembly has an annular groove formed radially in the center of the circumferential surface. A hollow barrel casing is provided to couple on the circumferential outer surface of the assembly so that the groove forms an annular storage to store lubricating grease. The groove has a plurality of apertures formed thereon to allow the lubricating grease to seep into the axial hole.

All the aforesaid conventional bearings do not provide dynamic pressure and lubricating media recycling mechanism, also lack adjustability in terms of supply channels of the lubricating media, and location and capacity of the storage chamber. They also are less flexible in terms of using diversified lubricating media. Their structures are more complex, that reduce the possibility of mass production.

The aforesaid lubricating media generally means any material capable of providing lubrication effect between the spinning shaft and the axial hole of the bearing, including but not limited to lower viscosity lubricating oil and higher viscosity lubricant, such as grease and hybrid lubrication agent containing solid lubricating grains.

Accordingly, it is desirable to provide a novel lubricating means which can overcome the described limitations, particularly to a heavy load bearing.

DETAILED DESCRIPTION OF THE PREFERRED EMBODIMENTS

Figure 1:
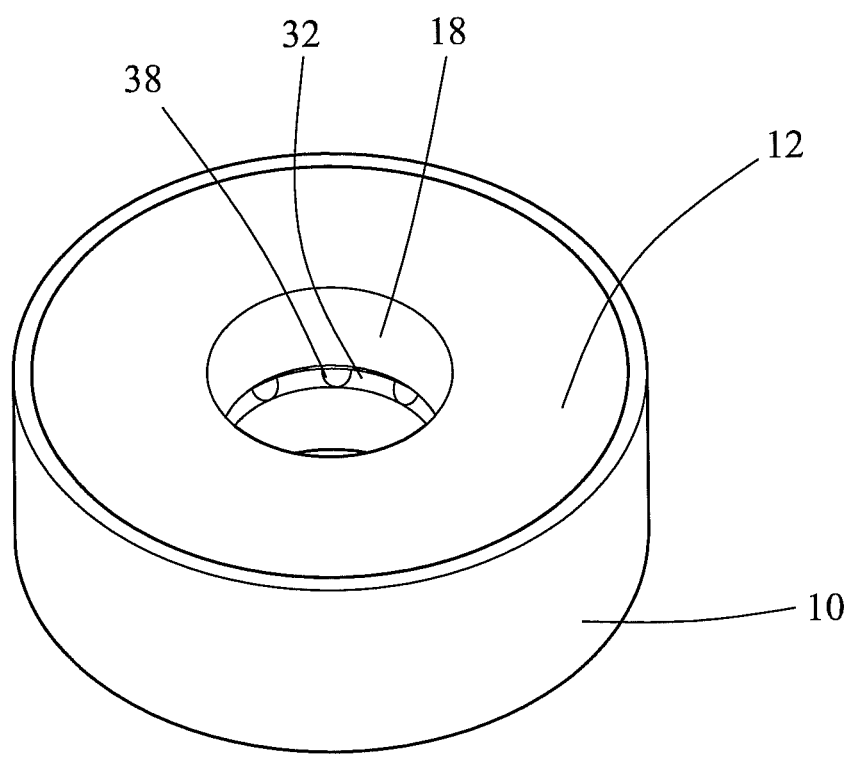
FIG. 1 is a perspective view of a first embodiment of the invention.

Please refer to FIGS. 1 through 15 for detailed discussions of the heavy load bearing of the invention.

FIGS. 1 through 4 illustrate a first embodiment of the invention. The heavy load bearing of the invention includes a casing 10 and an assembly 12.

The hollow casing 10 is formed in a cylindrical shape to form an axial cavity 11 inside to encase the assembly 12 to form a sturdy bearing structure which is made from a dense solid or porous material.

The assembly 12 also is made from a dense solid or porous material, and includes two units 16 coupled together axially. Each unit 16 has an axle hole 25 run through axially. The axle holes 25 of these two units 16 form an axial hole 18 of the assembly 12 run through by a shaft. Each unit 16 has a circumferential outer surface formed a mounting portion 20 and two end surfaces formed connection portions 22 and 23. The mounting portion 20 is formed in a shape and size mating the cavity 11 so that it is tightly in contact with an inner wall surface of the cavity 11 to allow the assembly 12 to be securely held in the cavity 11. Also referring to FIGS. 2 and 3, the unit 16 also has a groove 27 indented axially from the end surface of the connection portion 22 towards a bottom wall 31 thereof. The groove 27 is annularly formed between an outer wall 29 near the mounting portion 20 and an inner wall 30 near the axle hole 25. In practice, the groove 27 can be formed in different sizes and shapes. In various embodiments herein, a typical groove 27 having a cross section formed in a rectangular shape serves as an example to facilitate discussions hereinafter. On a free end of the inner wall 30 has multiple notches 35 annularly formed thereon and communicating with the groove 27 and axle hole 25. The axle hole 25 has a wall surface at one end formed a trench 36 with an enlarged opening directing towards the connection portion 22. The trench 36 communicates with and covers multiple recesses 41 formed on the wall surface of the axle hole 25 corresponding to the notches 35. The two units 16 are axially coupled together through abutting connection portions 22 to form the assembly 12, and the mounting portion 20 is tightly in contact with the cavity 11 of the casing 10 such that the notches 35 of the abutting units 16 form multiple fine flow passages 32 on the connection portions 22 to allow lubricating media to seep and flow into the axial hole 18 to lubricate the shaft. The fine flow passages 32 have an equivalent hydraulic diameter twice the notches 35. The two abutting trenches 36 are coupled to form an annular ditch 38 to communicate with and cover multiple passage ports 42 formed on the wall surface of the axial hole 18 and corresponding to the fine flow passages 32. Each annular ditch 38 has a cross section gradually shrunk upon viewing towards the passage ports 42. The two abutting units 16 are coupled together via the connection portions 22 to allow the grooves 27 to form a storage chamber 15 with a rectangular cross section to store lubricating media. The storage chamber 15 has a capacity twice that of the groove 27. The fine flow passages 32 communicate with the storage chamber 15 and axial hole 18. Thus forms the heavy load bearing of this embodiment. The lubricating media generally means lubricating oil, or grease or hybrid lubrication agent containing solid lubricating grains that have a higher viscosity than the lubricating oil.

In the heavy load bearing of the invention, each unit 16 of the assembly 12 has the entire circumferential outer surface serving as the mounting portion 20 so that when the units 16 are held in the cavity 11, the axial hole 18 formed by the axle holes 25 is precise coaxially to facilitate control and improve quality in mass production. Moreover, since the assembly 12 forms a tight contact with the inner wall surface of the cavity 11 with a maximum contact area, total structural strength and heat conductivity of the bearing are enhanced directly, thus loading and vibration-resistant capabilities also improve.

When the shaft spins in the axial hole 18 of the bearing the lubricating media in the storage chamber 15 is expanded due to receiving heat generated by tribology. As a result, the viscosity of the lubricating media reduces and fluidity increases. Hence the lubricating media can flow via the fine flow passages 32 into the axial hole 18. In addition, during spinning of the shaft, a centrifugal force is generated to reduce the pressure of the fine flow passages 32 towards the axial hole 18, while the pressure towards the storage chamber 15 is higher. The pressure difference at two ends of the fine flow passages 32 can further push the lubricating media from the storage chamber 15 to the axial hole 18. Therefore the lubricating interface between the axial hole 18 and shaft is much thicker than the conventional self-lubricating bearings pre-infiltrated with lubricating oil of a lower viscosity. Moreover, because of the units 16 are made of the porous material pre-infiltrated with lubricating oil, aside from the lubricating mechanism between the axial hole 18 and shaft to provide the lubricating media through the storage chamber 15 and fine flow passages 32 as previously discussed, the lubricating oil contained in the porous material also can be supplied through capillary forces to further improve lubricating interface and enhance tribology effect.

Furthermore, when the shaft is spinning in the axial hole 18, it squeezes and converges the lubricating media in the annular ditch 38 with a gradually shrunken cross section that is supplied by a fine flow passage 32 approaching the shaft to form a dynamic pressure to support the shaft, and immediately pushes the lubricating media via another adjacent fine flow passage 32 into the storage chamber 15. Then the shaft approach the next fine flow passage 32 to get supply the lubricating media therefrom, and also squeezes and converges the lubricating media supplied by the approaching fine flow passage 32 to form another dynamic pressure to support the shaft, and then the lubricating media is pushed into the storage chamber 15 again via yet another adjacent fine flow passage 32. Thus with the shaft rotating cyclically in the annular ditch 38 to squeeze and converge the lubricating media supplied from the fine flow passage 32 approaching the shaft, continuous dynamic pressure is formed to support the shaft. Through the gradually shrunken cross section of the annular ditch 38, the lubricating media can be recycled and stored in the storage chamber 15 via the next adjacent fine flow passage 32. Therefore a multi-channel dynamic-pressure and recyclable lubricating media mechanism is formed to provide strong support for the spinning shaft. Because the heavy load bearing of the invention provides automatic replenishment and recycling of the lubricating media, and a novel lubricating mechanism with continuous dynamic pressure is formed to provide strong support for the shaft; therefore, enhance loading capacity and anti-vibration capabilities, and prolong the lifespan.

The axial cross section of the storage chamber 15 can be formed according to the groove 27 in various capacities and shapes, such as diamond shape, arched shape, polygonal shape or the like. Hence the profiles of the storage chamber 15 illustrated in this embodiment shall not be deemed as the limitation of the invention.

By adjusting the shape, number and size of the notches 35, the lubricating media in the storage chamber 15 can flow steadily through the fine flow passages 32 to between the inner wall of the axial hole 18 and outer wall of the shaft in response to varying tribology conditions, and greatly extend and improve operation limit and lifespan of the bearing.

Figure 4:
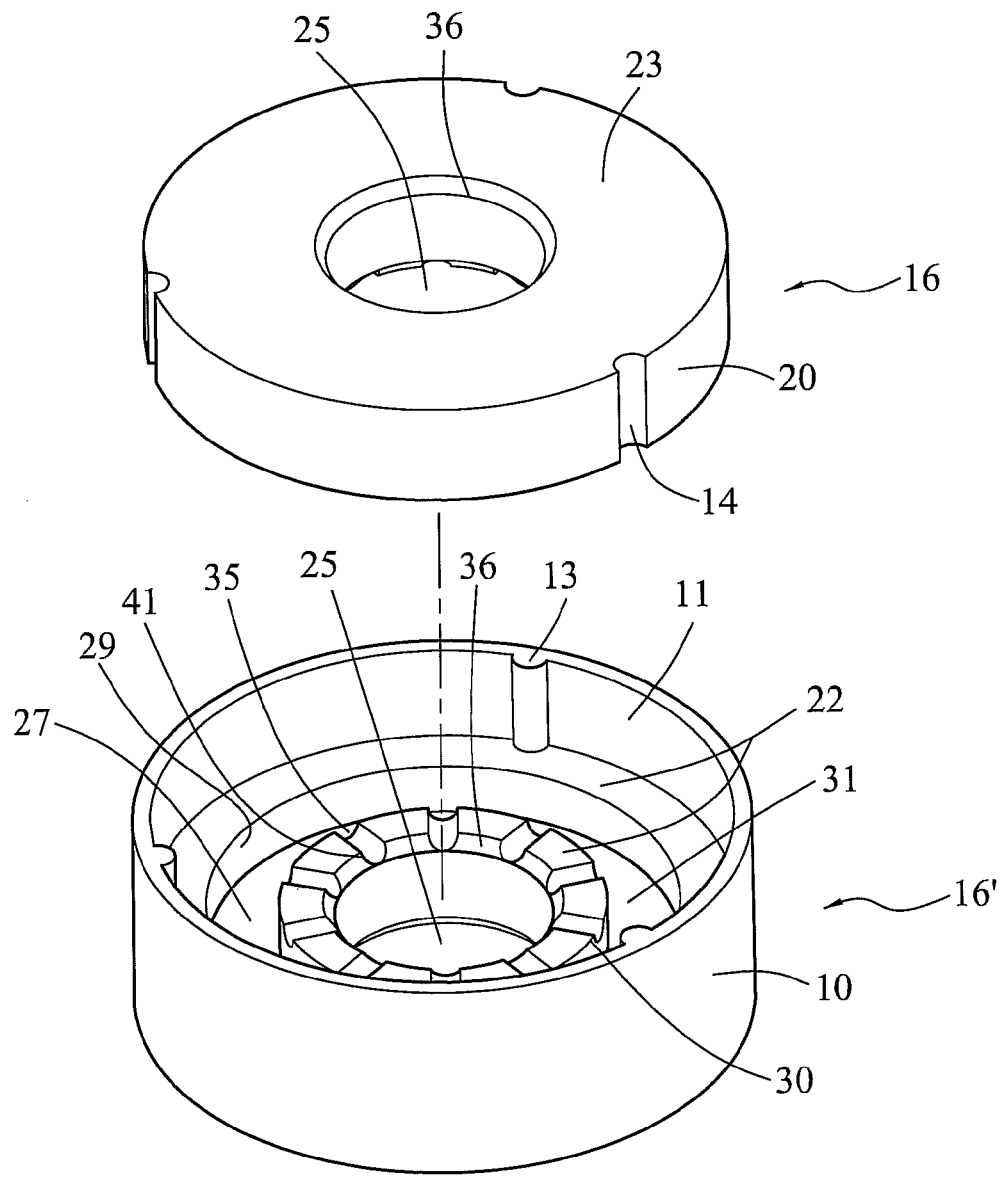
FIG. 4 is another exploded view of the first embodiment of the invention.

Please refer to FIG. 4 for another exploded view of the first embodiment of the invention. It differs from FIGS. 1 through 3 by having the mounting portion 20 of the unit 16 and the inner wall surface of one end of the casing 10 preformed to become an integrated member 16', and then the connection portion 22 of the integrated member 16' is coupled with another connection portion 22 of another unit 16. Thereby fabrication process is simpler to facilitate mass production and also further enhance total structural strength. In addition, the casing 10 has three sharing ribs 13 formed axially on the inner wall surface thereof, and the mounting portion 20 of another unit 16 has slots 14 formed on the circumferential outer surface mating the ribs 13 for latching to further improve mass production process and structural strength of the heavy load bearing.

Figure 5:
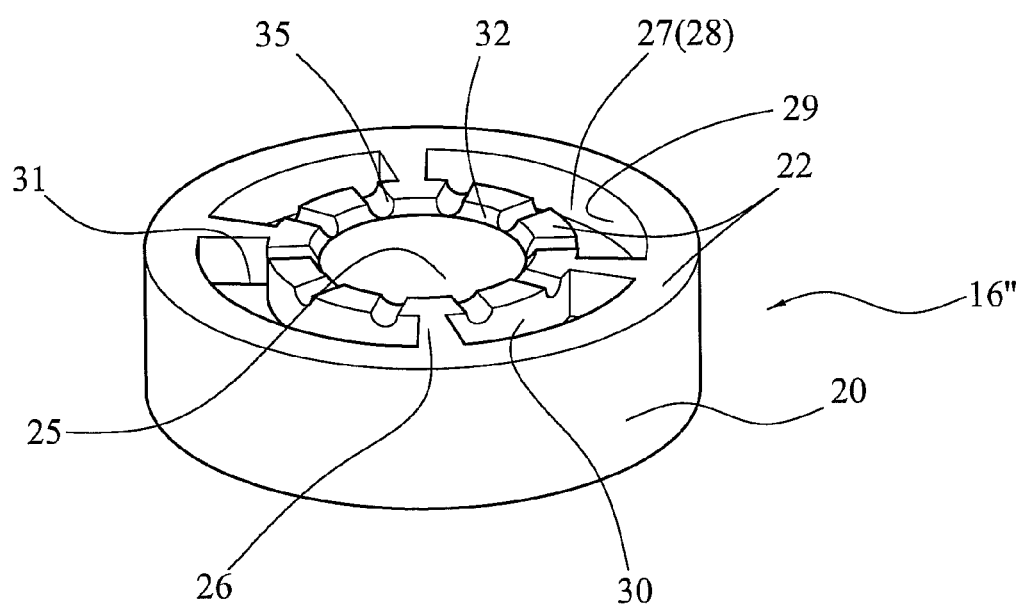
FIG. 5 is a perspective view of another type of unit of the invention.
Figure 6:
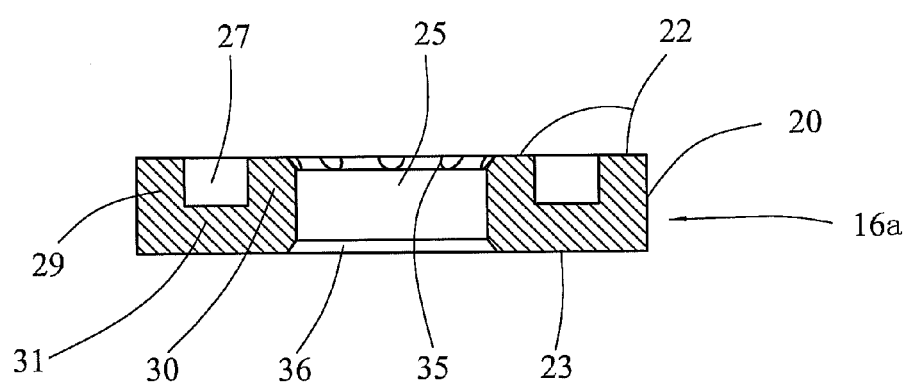
FIG. 6 is a sectional view of unit-1 of the invention.
Figure 7:
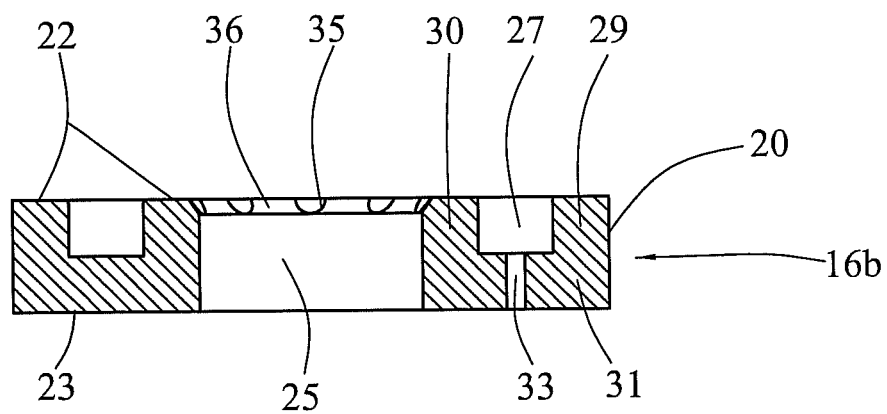
FIG. 7 is a sectional view of unit-2 of the invention.
Figure 8:
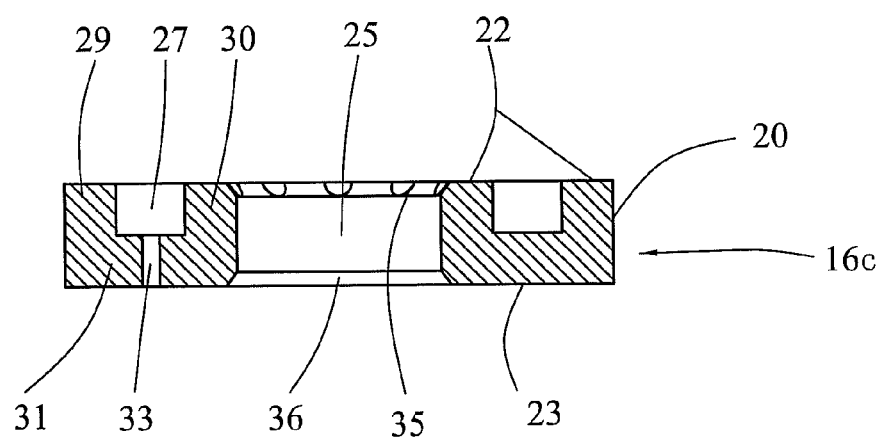
FIG. 8 is a sectional view of unit-3 of the invention.
Figure 9:
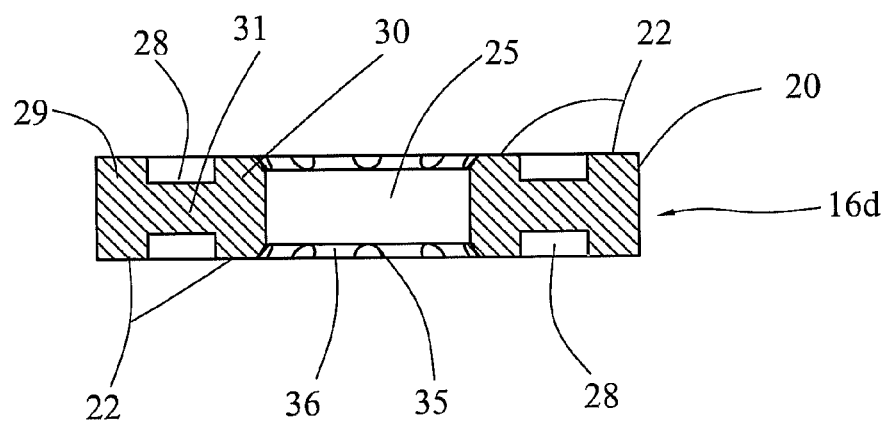
FIG. 9 is a sectional view of unit-4 of the invention.
Figure 10:
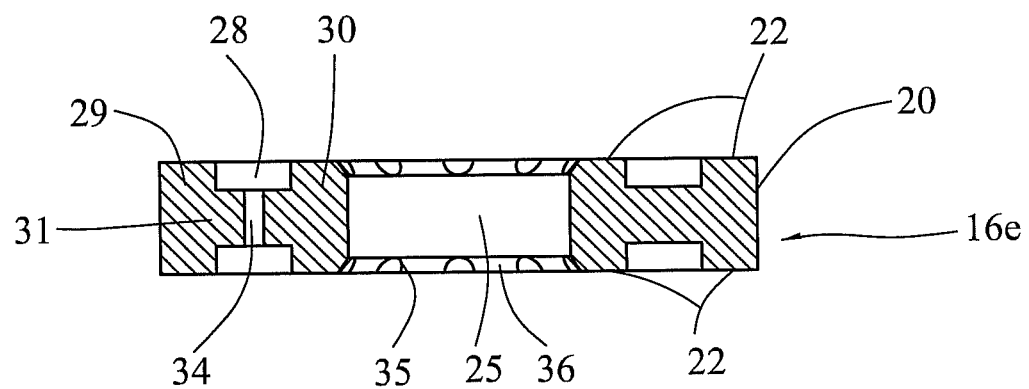
FIG. 10 is a sectional view of unit-5 of the invention.
Figure 11:
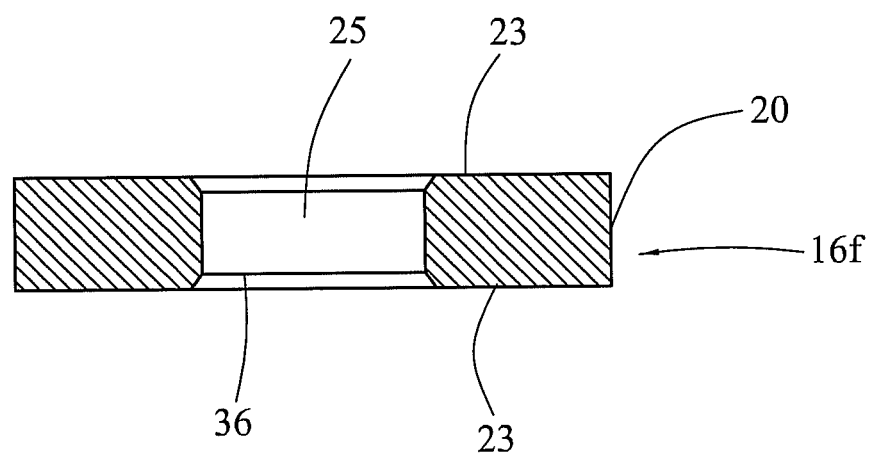
FIG. 11 is a sectional view of unit-6 of the invention.

FIGS. 5 through 10 illustrate a series of representative units 16", 16a, 16b, 16c, 16d and 16e with features mostly matching that of the first embodiment but with some differences. In FIG. 6, the unit 16a differs from the unit 16 in FIG. 3 by having trenches 36 formed on the wall surfaces at two ends of the axle hole 25 with openings enlarged towards the two connection portions 22 and 23. In FIG. 7, compared with the unit 16, the groove 27 of the unit 16b has a plurality of holes 33 running through from the bottom wall 31 to the connection portion 23. In FIG. 8, compared with the unit 16, the unit 16c has two trenches 36 formed on the wall surfaces at two ends of the axle hole 25 and having openings enlarged towards the two connection portions 22 and 23, and the groove 27 has a plurality of holes 33 running through from the bottom wall 31 to the connection portion 23. In FIG. 9, compared with the unit 16, the unit 16d has two grooves 28 indented axially from the two connection portions 22 towards the surface of the bottom wall 31 and formed between the outer wall 29 near the mounting portion 20 and the inner wall 30 near the axle hole 25. The inner wall 30 has two free ends each end with multiple notches 35 formed annularly thereon and communicating with the grooves 28 and axle hole 25. The unit 16d further has two trenches 36 formed on the wall surfaces at two ends of the axle hole 25 with the openings enlarged towards the two connection portions 22. In FIG. 10, the unit 16e has a plurality of holes 34 running through the common bottom wall 31 of the two grooves 28. In FIG. 11, the unit 16f, aside from having two trenches 36 formed on the wall surfaces at two ends of the axle hole 25 with the openings enlarged towards the two connection portions 23, no grooves 27 and 28 and notches 35 are provided.

Figure 2:
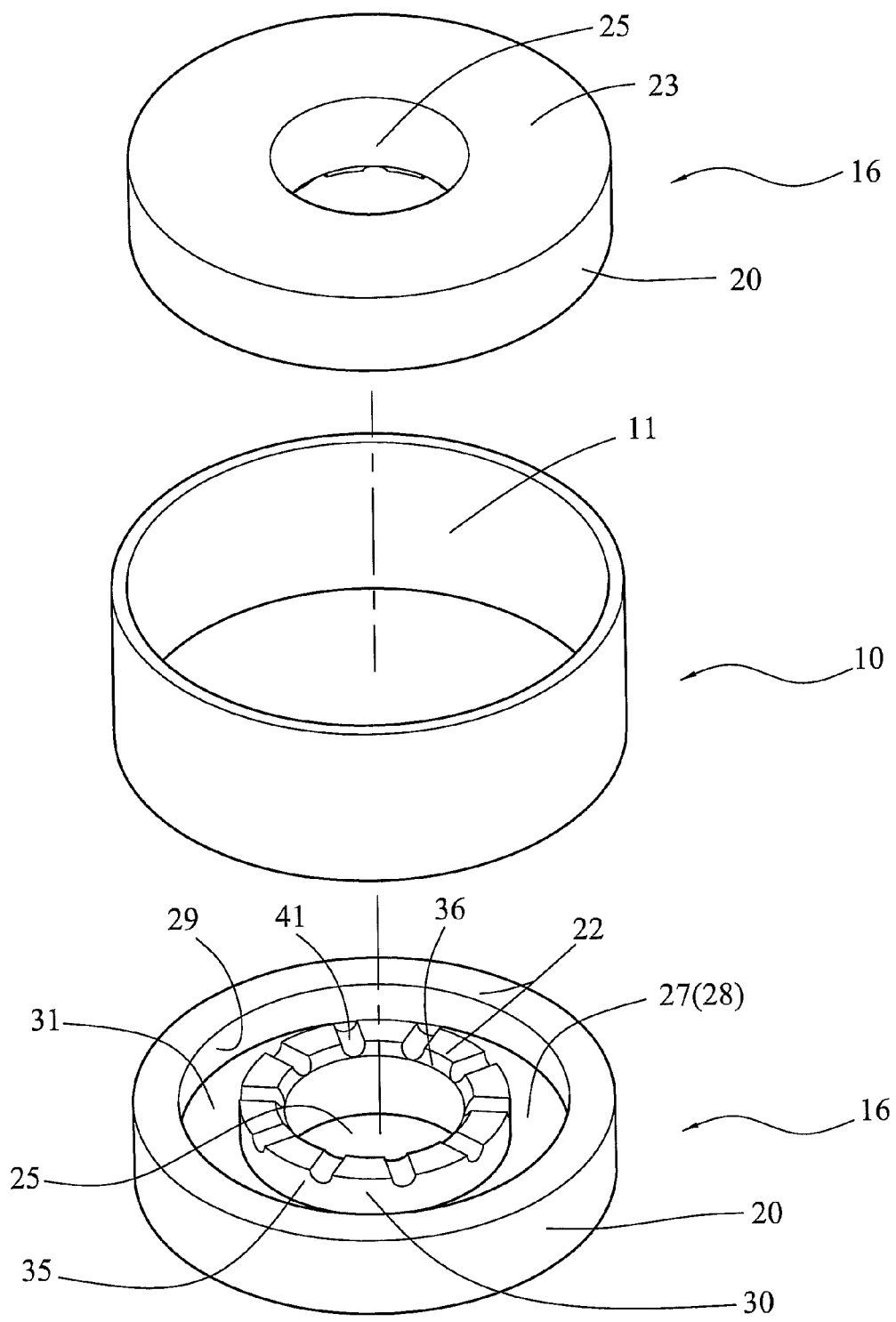
FIG. 2 is an exploded view of the first embodiment of the invention.
Figure 3:
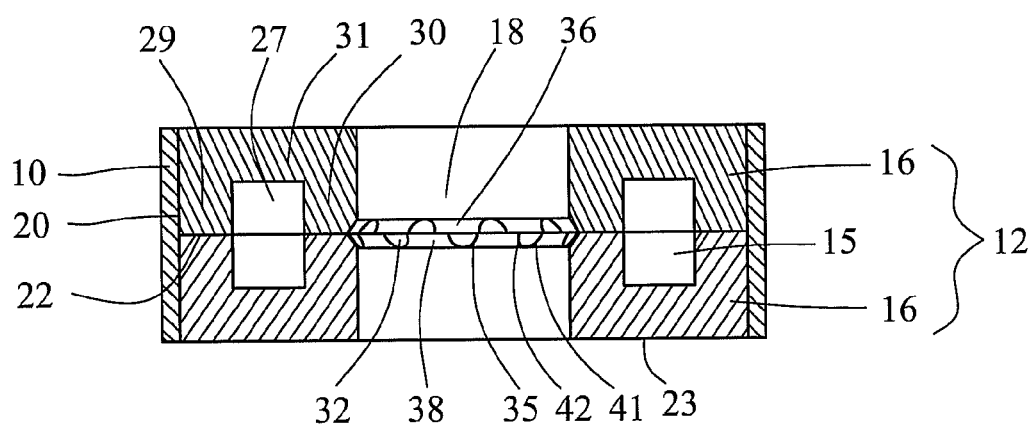
FIG. 3 is a sectional view of the first embodiment of the invention.

Compared with the unit 16 in FIG. 2 that has the grooves 27 and 28, the unit 16" in FIG. 5 also has a plurality of reinforcing ridges 26 among the grooves 27 and 28 to further strengthen integral structure of the heavy load bearing of the invention. The reinforcing ridges 26 are preferably formed between the abutting notches 35 and bridge the wall surfaces of the outer wall 29, inner wall 30 and bottom wall 31 of the grooves 27 and 28, and connect to the wall surface of the bottom wall 31, and also are respectively formed at an elevation the same as the free end of the outer wall 29 or the inner wall 30 to divide the grooves 27 and 28 into a plurality of independent smaller grooves. In practice, the reinforcing ridges 26 may also fasten to the wall surfaces of the outer wall 29 and inner wall 30 of the grooves 27 and 28, and are respectively formed at an elevation lower than the outer wall 29 or the inner wall 30 to increase structural strength and form a plurality of smaller grooves communicating with each other. To facilitate discussion, in the following embodiments no reinforcing ridges 26 are included, as shown in FIG. 3 and FIGS. 6 through 11 to highlight the features of units 16, 16a, 16b, 16c, 16d, 16e and 16f on the function accomplished by varying arrangements of the units.

The heavy load bearing of the invention has the mounting portions 20 formed on the entire circumferential outer surfaces of the units to tightly contact with the inner wall surface of the cavity 11 of the casing 10, and the outer wall 29 and inner wall 30 having the free ends with large contact surface formed thereon, the connection portions 22 to couple the units together, and reinforcing ridges 26 bridging the outer wall 29 and inner wall 30 of the grooves 27 and 28, total structural strength increases and heat conductivity of the tribology interface also improves, therefore can greatly enhance loading and vibration-resistant capabilities.

Figure 12:
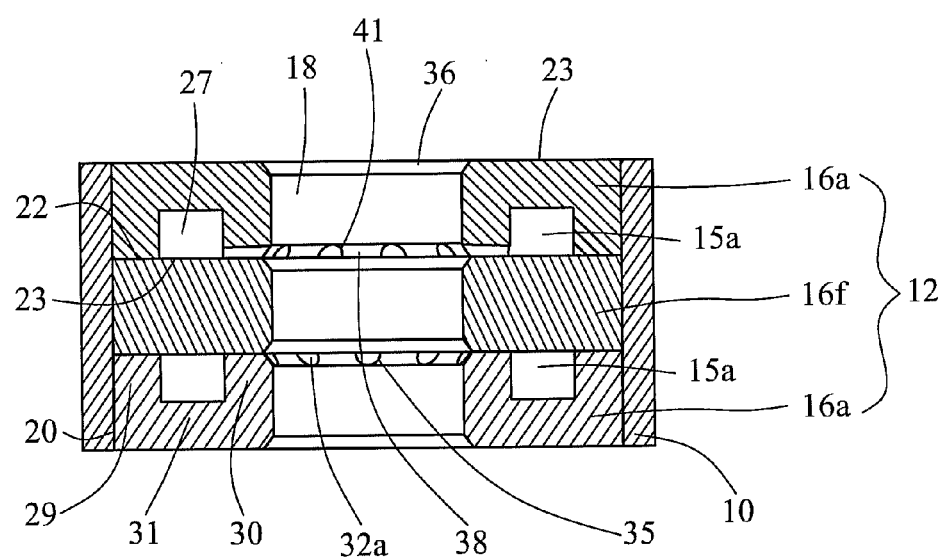
FIG. 12 is a sectional view of a second embodiment of the invention.

FIG. 12 illustrates a second embodiment of the invention. The assembly 12 includes two types of units 16a and 16f arranged in two sets of abutting units 16a and 16f, and 16f and 16a, and tightly held in the cavity 11 of the casing 10 via the mounting portion 20 to form a heavy load bearing. The units 16a have respectively one set of multiple notches 35 connected to the connection portion 23 of the abutting unit 16f to form two sets of multiple fine flow passages 32a. One set of the fine flow passages 32a have an equivalent hydraulic diameter one half of the fine flow passages 32 previously discussed. The grooves 27 of the units 16a and the connection portion 23 of the abutting unit 16f are coupled to form two storage chambers 15a with a rectangular cross section to supply lubricating media through the fine flow passages 32a. Each storage chamber 15a has a capacity half of that of the storage chamber 15 previously discussed. The fine flow passages 32a communicate with the storage chambers 15a and axial hole 18. When the shaft rotates in the axial hole 18, through the two sets of annular ditches 38 formed by the two sets of abutting trenches 36, continuous dynamic pressure is generated to support the shaft and the lubricating media is recycled to be uniformly spread on the tribology interface.

Figure 13:
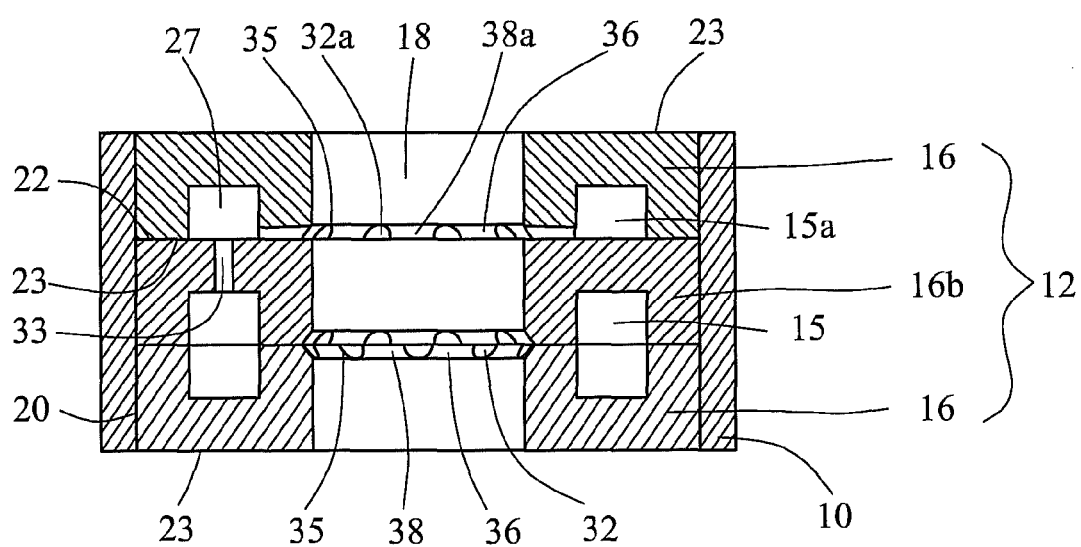
FIG. 13 is a sectional view of a third embodiment of the invention.

FIG. 13 illustrates a third embodiment in which the assembly 12 includes two types of units 16 and 16b arranged in two sets of abutting units 16 and 16b, and 16b and 16, and tightly held in the cavity 11 of the casing 10 via the mounting portion 20 to form a heavy load bearing. The abutting units 16b and 16 have two sets of multiple notches 35 to form one set of multiple fine flow passages 32 at a greater equivalent hydraulic diameter. Another unit 16 has one set of multiple notches 35 coupled with the connection portion 23 of the unit 16b to form another set of multiple fine flow passages 32a with smaller equivalent hydraulic diameter. The two abutting units 16b and 16 have two grooves 27 coupled to form a storage chamber 15 with greater capacity, while another unit 16 has another groove 27 coupled with the connection portion 23 of the unit 16b to form another storage chamber 15a with smaller capacity. The two sets of multiple fine flow passages 32 and 32a communicate respectively with the two storage chambers 15 and 15a and the axial hole 18. The unit 16b has multiple holes 33 in the groove 27, the lubricating media held in the two storage chambers 15 and 15a can maintain at a pressure balance to allow the lubricating media is uniformly spread in the fine flow passages 32 and 32a. When the shaft rotates in the axial hole 18, through one set of wider annular ditches 38 formed by two sets of trenches 36 of the abutting units 16b and 16 and another set of narrower annular ditches 38a formed by one set of trenches 36 of the unit 16 and the connection portion 23 of another unit 16b, continuous dynamic pressure is generated to support the shaft and the lubricating media can be recycled.

Figure 14:
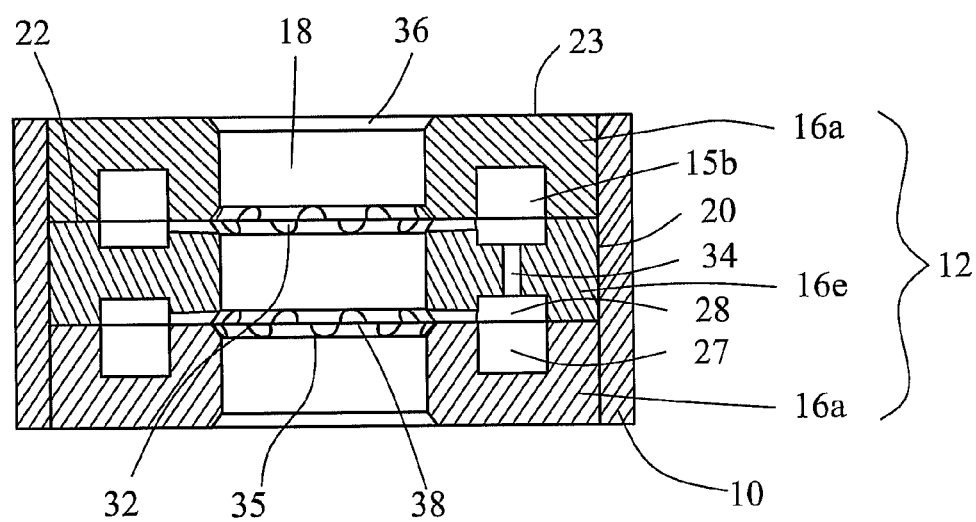
FIG. 14 is a sectional view of a fourth embodiment of the invention.

FIG. 14 illustrates a fourth embodiment in which the assembly 12 includes two types of units 16a and 16e arranged in two sets of abutting units 16a and 16e, and 16e and 16a, and tightly held in the cavity 11 of the casing 10 via the mounting portion 20 to form a heavy load bearing. The two sets of abutting multiple notches 35 form two sets of multiple fine flow passages 32, and one groove 27 and another abutting groove 28 are coupled to form two storage chambers 15b. The two sets of fine flow passages 32 communicate with the two storage chambers 15b and axial hole 18. The unit 16e has a plurality of holes 34 running through the two grooves 28, hence the pressure in the two storage chambers 15b are maintained at a balanced condition to allow the lubricating media to be uniformly spread in the fine flow passages 32. When the shaft rotates in the axial hole 18, through two sets of annular ditches 38 formed by two sets of abutting trenches 36, continuous dynamic pressure is generated to support the shaft and the lubricating media can be recycled.

In this embodiment, the notches 35 having the same number and intervals on the two abutting units 16a and 16e do not have to be aligned and positioned precisely. The two sets of abutting multiple notches 35 can be randomly positioned to form one set of multiple staggered fine flow passages 32 with the number twice that of the notches 35. The staggered fine flow passages 32 and another set of multiple aligned fine flow passages 32 that is formed by alignment and position fabrication processes and has the same number as that of the notches 35 with respectively the same equivalent hydraulic diameter, hence the abutting units 16a and 16e can be randomly arranged to allow the two sets of staggered notches 35 to form one set of staggered fine flow passages 32. As a result, fabrication process can be simplified to facilitate mass production, and the lubricating medium can be evenly distributed and the cost can be reduced.

Figure 15:
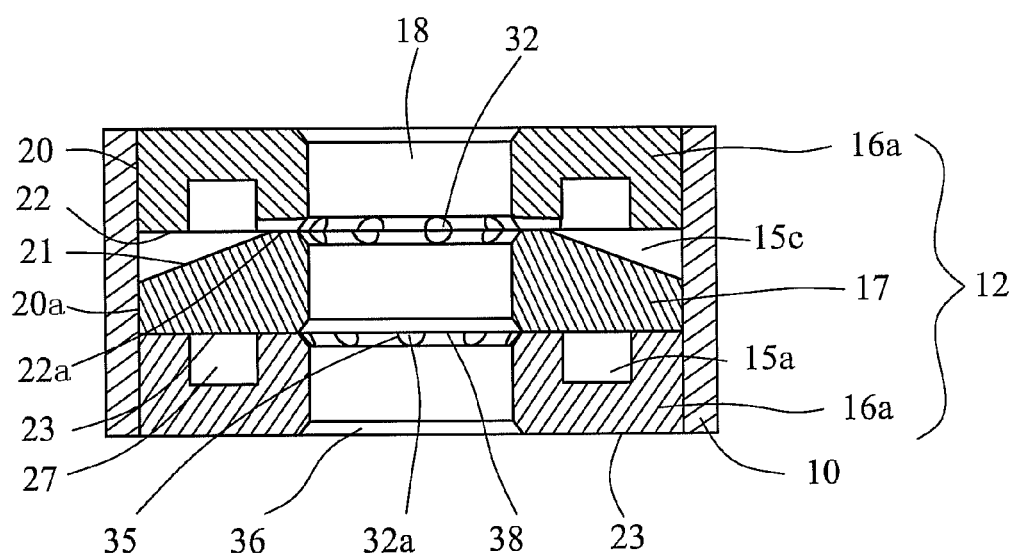
FIG. 15 is a sectional view of a fifth embodiment of the invention.

Please refer to FIG. 15 for a fifth embodiment of the invention. The assembly 12 includes two types of units 16a and 17 arranged in two sets of abutting units 16a and 17, and 17 and 16a, and tightly held in the cavity 11 of the casing 10 via mounting portions 20 and 20a to form a heavy load bearing. The unit 17 has an axle hole 25 the same as that of other unit 16a and has a mounting portion 20a shorter than another assembly 20 of another unit 16a but at the same diameter. The mounting portion 20a is extended towards the axle hole 25 to another end of the unit 17 to form a conical waist portion 21 which has two ends formed respectively a connection portion 22a close to the conical top and another connection portion 23 close to the conical bottom. The connection portion 22a has a free end formed one set of notches 35 in an annular fashion communicating with the axle hole 25 and waist portion 21. Two sets of abutting notches 35 are coupled to form one set of multiple fine flow passages 32, and another set of notches 35 and an abutting connection portion 23 form another set of multiple fine flow passages 32a. One unit 16a has a groove 27 coupled with an outer wall surface of the waist portion 21 of the abutting unit 17 and the inner wall surface of the cavity 11 of the casing 10 to form a storage chamber 15c with a polygonal cross section, and the groove 27 coupled with the connection portion 23 of the abutting unit 17 to form another storage chamber 15a with a rectangular cross section. The two sets of fine flow passages 32 and 32a communicate respectively with the two storage chambers 15c and 15a and axle hole 18. When the shaft rotates in the axial hole 18, through two sets of the annular ditches 38 formed by two sets of abutting trenches 36, continuous dynamic pressure is generated to support the shaft and the lubricating media can be recycled.

In the various embodiments of the heavy load bearing set forth above, at least one unit of the assembly is arranged radially and randomly so that the two sets of abutting notches that communicate with the trenches and are arranged in a staggered manner form one set of staggered fine flow passages communicating with the annular ditches. All this aims to facilitate discussion of the features of the invention. In practice, the heavy load bearing could have the shaft spinning at a speed more than tens of thousand RPM to pass swiftly through the fine flow passages on the axial hole. Obviously, at least one unit of the assembly can also be arranged radially in a selected position so that the two sets of abutting notches that communicate with the trenches and aligned to each other form one set of multiple aligned fine flow passages communicating with the annular ditches. The staggered and aligned fine flow passages have the same equivalent hydraulic diameter. Hence same function and effect can be accomplished in various embodiments set forth above without being constrained by fabrication complexity and precise positioning.

In order to further simplify fabrication process to facilitate mass production and enhance structural strength, in the assembly of the invention at least one unit can be integrally formed with the inner wall surface of the casing via the mounting portion as a monolithic piece, then is coupled with other units as depicted in the embodiments previously discussed.

On the assembly of the invention the circumferential outer surface of the mounting portion of each unit may also have at least one axial rib formed thereon, and the inner wall surface of the cavity of the casing also has at least one slot corresponding to the rib to latch with each other to form precise positioning and enhance structural strength.

Thus, the invention provides a structure capable of responding to different loading lengths of the shaft, and the number and capacity of the storage chamber can be expanded, and the type and injecting positions of the lubricating media also can be adjusted. Fabrication process for mass production also can be simplified to reduce production cost. Improved total structural strength and enhanced thermal conductivity of the tribology interface can be achieved. Moreover, strong dynamic pressure can be generated continuously, and the lubricating media can be recycled. Thus the heavy load bearing can meet application requirements of diversified industries.

In the aforesaid embodiments, forming of the multiple fine flow passages can be made according to the following formula:

$$-2 \leq \log D \leq 0.5 \times \log(2 \times Sd \times H/N)$$

where N is total number of the fine flow passages in the heavy load bearing, D is the equivalent hydraulic diameter of each fine flow passages (mm), Sd is the diameter of the shaft (mm), and H is the length of the axial hole (mm).

As a conclusion, based on the techniques and features previously discussed, the invention can provide many advantages, notably:

1. Provides a novel heavy load bearing including at least two units. At least one unit of the assembly has at least one indented groove formed thereon, and the groove has an inner wall with a free end which has multiple notches formed thereon annularly and communicating with the axle hole. The abutting units are coupled to allow the notches to form multiple fine flow passages to transmit lubricating media and allow the grooves to form at least one storage chamber to store the lubricating media. The loading length, and number and capacity of the storage chamber are adjustable, and an evenly distributed lubricating interface can be formed.

2. Provides a heavy load bearing that can store a large amount of diversified lubricating media. Through the diversified storage chambers and multiple fine flow passages formed via varying arrangements of the abutting units, a continuous, uniform and stable lubricating interface is formed between the shaft and axial hole to improve tribology, therefore can extend and improve operation limit and lifespan of the bearing.

3. Provides a heavy load bearing that has a strong total structure and improved heat conductivity. Through the mounting portion formed on the entire circumferential outer surface of each unit to tight contact with the inner wall surface of the cavity of the casing, the free ends of the outer wall and inner wall having large contact area, the connection portions of the units coupling with each other, and multiple reinforcing ridges bridging the outer wall and inner wall of the groove, total structural strength increases and heat conductivity of the tribology interface improves, therefore loading and vibration-resistant capabilities also are enhanced significantly.

4. Provides a heavy load bearing product platform with a modular design and simplified fabrication process to facilitate mass production. Mold design is simpler and the number of the molds required is fewer for mass production. During assembly, the shape and size of the circumferential outer surface of the mounting portion mate the inner wall surface of the cavity of the casing so that the axle holes are precisely and axially aligned to form the axial hole and total structural strength also improves. No complicated and precise positioning fabrication processes are needed for alignment of the multiple fine flow passages on the abutting units. Hence mass production process is simpler, and control and improvement of product quality are easier, and the cost can be greatly reduced.

5. Provides a novel lubricating mechanism with strong support for the spinning shaft. Through the shaft rotating in the annular ditch to squeeze and converge the lubricating media supplied by a fine flow passage approaching the shaft to form dynamic pressure to support the shaft and the lubricating media being recycled and stored in the storage chamber through a next fine flow passage, the dynamic pressure can be generated continuously and the lubricating media can be recycled.

6. Provides a heavy load bearing product platform with a flexible design and versatile applications. By adjusting various parameters, such as the shape, number, size and arrangement of the units, the shape, forming mode, location, number and size of the fine flow passages, the shape and number of the trenches, the number and capacity of the storage chamber, and the type and injecting location of the lubricating media, different types of heavy load bearings can be developed and made in response to varying tribology conditions and requirements in diversified industries.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A heavy load bearing, comprising:
a hollow casing which is formed in a cylindrical shape to form an axial cavity inside; and
an assembly including at least two units, each unit including two opposite ends, each end forming a connection portion, the at least two units including at least one set of two adjacent units being axially coupled together with one of the two adjacent units abutting against another one of the two adjacent units to allow at least one set of two abutting connection portions of the at least one set of the two adjacent units to be contacted therebetween to form the assembly, and a largest circumferential outer wall surface between two connection portions of each unit forming a mounting portion to allow the assembly to be fixedly encased in and fully contacted with the cavity of the casing to form the heavy load bearing, each unit further containing an axle hole axially running through the two opposite ends thereof, axle holes of the at least two units forming an axial hole of the assembly for insertion of a spinning shaft to be supported and lubricated by the heavy load bearing;
wherein at least one groove is defined between the at least one set of the two adjacent units of the assembly, the at least one groove being axially indented from at least one of the two opposite ends of each unit to a bottom wall thereof and formed between at least one outer wall near the mounting portion and at least one inner wall near the axle hole, at least one set of multiple notches defined between the at least one set of the two adjacent units of the assembly, the at least one set of multiple notches being annularly formed on at least one free end of the at least one inner wall and communicated with the at least one groove and the axle hole, the at least one groove forming at least one storage chamber to store lubricating media, the at least one set of multiple notches forming at least one set of multiple passages of the assembly to communicate with the at least one storage chamber and the axial hole.

2. The heavy load bearing of claim 1, wherein each unit of the assembly includes at least one trench with an enlarged opening on at least one end of a wall surface of the axle hole directing towards at least one of the two connection portions.

3. The heavy load bearing of claim 2, wherein the at least one trench communicates with at least one set of recesses corresponding to the at least one set of multiple notches on the wall surface of the axle hole.

4. The heavy load bearing of claim 2, wherein the at least two units of the assembly are axially coupled with each other to allow the at least one trench of each unit to form at least one annular ditch of the assembly which communicates with at least one set of passage ports corresponding to the at least one set of multiple passages on a wall surface of the axial hole.

5. The heavy load bearing of claim 4, wherein the at least one set of the two adjacent units of the assembly is installed randomly such that at least one pair of the at least one set of multiple notches respectively communicate with the at least one trench and are arranged in a staggered manner to form at least one set of staggered multiple passages communicating with the at least one annular ditch.

6. The heavy load bearing of claim 4, wherein the at least one set of the two adjacent units of the assembly is installed according to a selected position such that at least one pair of the at least one set of multiple notches respectively communicate with the at least one trench and are arranged in an aligned manner to form at least one set of aligned multiple passages communicating with the at least one annular ditch.

7. The heavy load bearing of claim 1, wherein the mounting portion is formed in a shape and dimension mating with the cavity of the casing such that the at least two units can be securely encased in the casing.

8. The heavy load bearing of claim 1, wherein the casing includes at least one rib axially extended on a circumferential inner wall surface and the mounting portion includes at least one slot on the circumferential outer wall surface corresponding to the at least one rib for latching.

9. The heavy load bearing of claim 1, wherein the mounting portion includes at least one rib axially extended on the circumferential outer wall surface and the casing includes at least one slot on a circumferential inner wall surface corresponding to the at least one rib for latching.

10. The heavy load bearing of claim 1, wherein the at least one outer wall and the at least one inner wall of the at least one groove are bridged by a plurality of reinforcing ridges.

11. The heavy load bearing of claim 10, wherein the reinforcing ridges are respectively fastened to the at least one outer wall, the at least one inner wall and the bottom wall of the at least one groove and formed at an elevation the same as a free end of the at least one outer wall or the at least one inner wall to divide the at least one groove into a plurality of independent small grooves.

12. The heavy load bearing of claim 10, wherein the reinforcing ridges are respectively connected to wall surfaces of the at least one outer wall and the at least one inner wall of the at least one groove and formed at an elevation lower than the at least one outer wall and the at least one inner wall to divide the at least one groove into a plurality of communicating small grooves.

13. The heavy load bearing of claim 1, wherein the at least one groove includes a plurality of holes running through the bottom wall thereof.

14. The heavy load bearing of claim 1, wherein the mounting portion is located on the circumferential outer wall surface close to one of the two connection portions of each unit and axially concaved towards another connection portion to form a waist portion of each unit in which any radial dimension of a circumferential outer wall surface formed thereon is smaller than the mounting portion.

16. The heavy load bearing of claim 1, wherein at least one unit of the assembly and the casing are integrally formed as a monolithic piece.

16. The heavy load bearing of claim 1, wherein the at least one set of multiple passages is arranged and expressed according to the following formula:

$$-2 \leq \log D \leq 0.5 \times \log(2 \times Sd \times H/N)$$

where N is total number of the at least one set of multiple passages in the heavy load bearing, D is an equivalent hydraulic diameter of each passage (mm), Sd is a diameter of the shaft (mm), and H is a length of the axial hole (mm).

* * * * *